INVENTOR.
ELLIS W. HAMILTON

United States Patent Office 3,396,846
Patented Aug. 13, 1968

3,396,846
CONTROL OF OIL-WATER INTERFACE
Ellis W. Hamilton, La Habra, Calif., assignor to Gulf Oil Corporation, Pittsburgh, Pa., a corporation of Pennsylvania
Filed May 17, 1966, Ser. No. 550,678
3 Claims. (Cl. 210—76)

ABSTRACT OF THE DISCLOSURE

Apparatus for maintaining the desired interface level between immiscible fluids of different densities within a separator in which the difference in the electrical energy required to rotate a mechanical element in the two fluids is used to derive an electrical signal controlling a valve in an outlet line from the vessel.

---

This invention relates to an improved method for indicating and regulating the interface between two immiscible fluids.

In producing an oil well, it is advantageous for the operator to separate the oil from unwanted fluids. By separating these unwanted fluids, and discharging them to a waste pit, the operator avoids the cost of handling greater volumes of fluids and is able to more nearly determine the amount of oil his wells are producing. The desired separation is normally accomplished by passing the fluids through a settling tank wherein the rate of flow of the co-mingled fluids is sufficiently reduced to allow gravitational separation. An interface will be established between the oil and fluids of higher specific gravity with the oil occupying the upper portion in the tank. To enhance this operation, settling tanks are constructed with the fill line located near the bottom of the settling tank. Entrained water which did not readily separate upon entry into the tank will percolate upward through the higher specific gravity fluids with resultant separation by cohesion. To achieve effective cohesion separation, it is necessary for the operator to control the height of the interface between the oil and the fluids of higher specific gravity. Heretofore, the equipment used for this control consisted of either electrical sensing devices or mechanical interface floats. Neither of these methods have proved satisfactory.

Floats operated in brines or sour crudes are subject to corrosion which will produce leaks in the float mechanism thereby rendering them ineffective. Normal wear of the float linkage will also operate to give erroneous indications. Owing to the narrow range of specific gravities in oil field produced fluids, slight deviations in the float mechanism will produce significant changes in the float's capability of operating in the manner for which designed.

Electrically controlled systems are likewise subject to attack by corrosion and such attack produces erratic action or complete failure of these systems. Produced oil field fluids contain elements sufficiently volatile to create an explosive atmosphere within which these electrical control systems must operate. These components must therefore be maintained in perfect working condition to prevent possible shorting out of the electrical system with resultant fires.

In the production of oil field fluids a wide range of foreign material is often suspended within the produced formation fluids. Foreign material such as fluid-loss additives, lost circulation material, sand and mud ingredients may be produced into the tank and encountered, at the interface level, in proportions sufficiently large to give erratic results in either the float or electrical sensing devices.

My invention is constructed so as to preclude the difficulties encountered in these float or electric sensing devices. By alleviating these shortcomings my invention will reduce the costs of required maintenance, simplify fluid handling techniques and operate to give more reliable control.

My invention resides in automatically controlling the fluid interface level in a settling tank by utilizing a power operated outlet valve actuated by a change in the amount of current required to turn a propeller residing in the fluid.

Another embodiment of my invention resides in automatically controlling the fluid interface level in a settling tank by utilizing a power operated outlet valve actuated by a change in the amount of current required to pump an aliquot sample of the fluid from the tank.

One of the principal objects of my invention is to provide a novel method and an improved apparatus for sensing and regulating the interface between two miscible fluids in a tank or vessel.

Another object of my invention is to provide a novel method and improved apparatus for sensing the change in position of the interface between two immiscible fluids contained in a tank or vessel.

Another object of my invention is to provide an improved apparatus for sensing and regulating the interface between two immiscible fluids in a tank or vessel whereby the detrimental effects of corrosion, explosion, foreign material and wear are reduced to a minimum.

Figure 1:
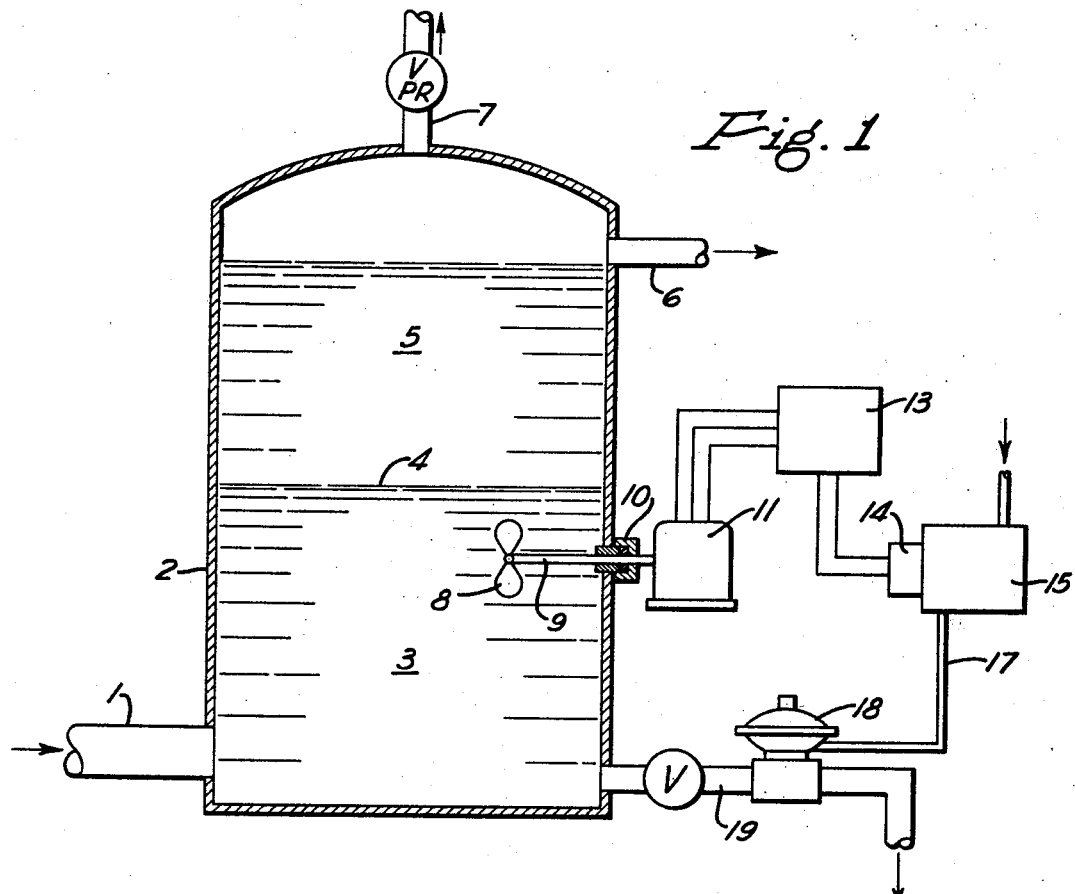
FIGURE 1 is a diagrammatic view, partially in vertical section, of an improved interface regulator constructed in accordance with my invention.

Referring to the drawings, reference numeral 1 represents incoming fill line through which the two immiscible fluids enter the tank or vessel 2, wherein these fluids percolate through the water, mud, or other high specific gravity incoming fluids 3, gravitationally separate, and form an interface level 4 between the oil 5, which is of a lower specific gravity and will occupy the upper portion of the tank 2, and the water, mud and higher specific gravity fluids 3 which will occupy a lower portion in the tank 2. The tank 2 is equipped with a pressure release valve 7 and an outlet line 6 whereby the fluids of lower specific gravity 5 may leave the tank 2.

On the side of the tank 2, at a height at which it is desired to maintain an interface 4, a rotating shaft 9 passes through the vessel 2, with a packing gland 10 encompassing the shaft 9 to prevent the leakage of fluids from the tank 2. An agitating body 8, preferably a propeller shaped body, is attached to the end of the shaft which extends approximately one-half of the radial distance into the tank 2 and is rotated by means of a constant speed electric motor 11 located outside the tank 2. The height of the fluid interface 4 within the tank 2 is controlled by a normally closed diaphragm operated control valve 18 placed in the drainline 19 and actuated by a signal received from an electrical controller 13 which measures the current requirements of the constant speed electrical motor 11.

The electrical controller 13 is so arranged that any load on the constant speed electrical motor 11 which decreases below a preselected value will energize solenoid 14. The solenoid 14 is connected to a pilot air valve 15 which normally vents air to the atmosphere. Energizing the solenoid 14 diverts the flow of air from the pilot air valve 15 into the air controller line 17 and opens the normally closed diaphragm operated control valve 18 permitting fluids of higher specific gravity 3 to drain from the tank 2.

Incoming fluids from oil well production most always contain varying amounts of water and other high specific gravity fluids. The incoming fluids enter the settling tank and gravitationally separate from the oil. The oil normally possesses the lowest specific gravity of the fluids produced and will therefore occupy the upper portion of the tank. An interface will then form between the oil and the fluids of higher specific gravity. It is desirous to maintain this interface to facilitate further separation in the settling tank by cohesion. Since additional fluids of higher specific gravity are being added during production, it becomes necessary to drain a portion of these fluids from the settling tank to maintain this interface. To automatically control the interface height, a propeller is located in the settling tank at the desired interface position. The propeller is rotated by a constant speed electric motor. As the heavy specific gravity fluid increase in the tank the interface level will be raised above the propeller body causing the propeller to operate in fluids other than oil. Normally, these fluids possess a lower viscosity than the formation oil being produced. As these high specific gravity, low viscosity, fluids come in contact with the rotating propeller, the current required to turn the propeller will be reduced. The electrical controller will sense this decreased load and energize the solenoid operated pilot air valve. The pilot air valve will actuate to divert the flow of air from the pilot valve to the normally closed diaphragm operated control valve that is located in the settling tank's drainline. The added pressure on the diaphragm will overcome the spring tension of the valve, permit the valve to open and drain the lower positioned high specific gravity unwanted fluid from the tank. As these lower fluids drain from the tank the interface level will drop to a point below the rotating propeller causing the propeller to again run in oil. Since the oil is of higher viscosity the motor load will increase. This increase in load will be sensed by the electrical controller which will de-energize the solenoid operated pilot air valve. Air from the pilot air valve will be diverted back to the atmosphere and the diaphragm operated control valve will close stopping flow from the tank.

Figure 2:
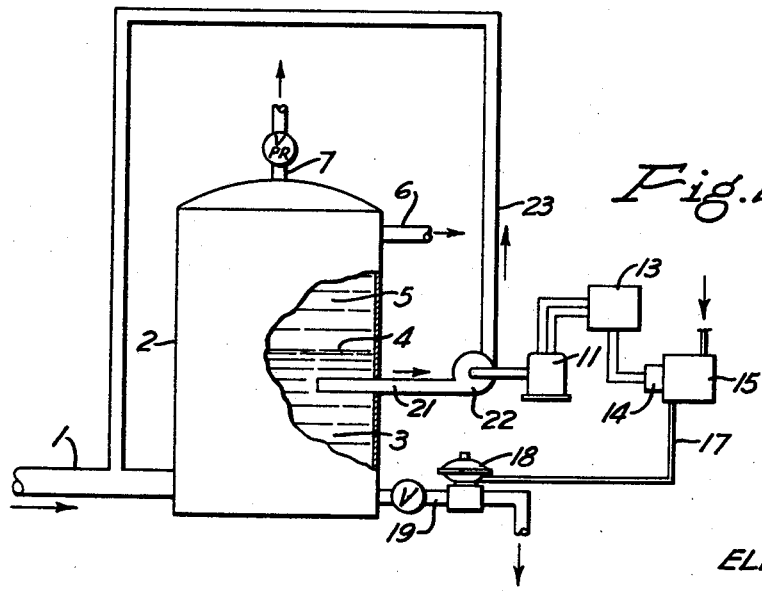
FIGURE 2 is a diagrammatic view, partially in vertical section, of an alternate improved interface regulator constructed in accordance with my invention.

FIGURE 2 represents an embodiment of this invention that differs from FIGURE 1. FIGURE 2 measures the power required to operate a centrifugal pump 22 and utilizes this measurement to control the interface 4 between the two fluids within the tank 2.

The device in FIGURE 2 utilizes a sample gathering tube 21 extending from a point located approximately one-half the radial distance within the tank 2, passing through the tank, and terminating at the intake manifold of an electrically operated centrifugal pump 22. The liquid discharge from the centrifugal pump 22 is recirculated back into the tank 2 by means of a bypass line 23 which terminates at the production fill line 1 or at other locations as selected by the operator.

A sample of the fluid passes from the tank into the sample gathering tube 21 and into the centrifugal pump 22. The current requirements of the constant speed eletric motor 11 operating this pump 22 are measured and any electrical motor load which decreases below a preselected value triggers an electrical controller 13 which in turn energizes a solenoid 14. The solenoid 14 is connected to a pilot air valve 15 which normally vents air to the atmosphere. Energizing the solenoid 14 diverts the flow of air from the pilot air valve 15 into the air control line 17 and opens the normally closed diaphragm operated control valve 18 permitting fluids of higher specific gravity 3 to drain from the tank 2.

In the embodiment of FIGURE 2 an aliquot sample of fluid is taken from the settling tank. The sample point will be located at the desired interface position. The sample will be delivered to the intake of an electrically operated centrifugal pump. When the sample consists of high specific gravity, low viscosity, fluids the electrical motor will operate on less current. The electrical controller connected to the motor will sense this reduced requirement and cause the drainline valve of the tank to operate as previously described. As the interface is lowered, and the sample being pumped changes to oil, there will be an increased current requirement. The electrical controller will sense this change and cause the drainline valve to close. The fluid discharge of the centrifugal pump is here recycled into the settling tank to prevent loss of the intermittent slugs of oil being pumped.

The general idea of regulating and controlling the interface of two miscible fluids at a predetermined point in a tank or vessel is widely used in the oil industry but heretofore has been accomplished by either manual methods or by float or electrical devices previously described. The novel method of interface control by utilizing the differing properties of viscosity, density and pressure, with the use of agitator bodies or a centrifugal pump operation, affords an apparatus which can be maintained without experiencing the detrimental effects caused by the fluid's explosive or corrosive properties.

The location of either the sample tube or the agitator body within the tank can be varied at the discretion of the operator and it is not my intention to restrict myself to the exact construction as illustrated or to limit my invention otherwise than as set forth in the claims. However, the particular means illustrated for sensing the interface level of the two immiscible liquids within a vessel by means of measuring the current requirements of a motor to turn an agitator or operate a centrifugal pump I regard as a preferred means for carrying out my invention.

Although I have described my invention as employed for the purpose of controlling the interface in produced oil field fluids and this I consider to be the main field of use for my invention, nevertheless I do not wish to limit my invention to any particular use since this invention could be employed to control the interface level in vessels containing other fluids.

Therefore I claim:

1. An apparatus for controlling the location of the interface between oil and immiscible fluids of higher specific gravity in a settling tank comprising a tubular sample gathering line opening through the wall of the settling tank, a centrifugal pump connected to the outer end of the tubular sample gathering line, an electric motor connected to the centrifugal pump adapted to drive the pump at constant speed, electrical control means operated by the constant speed electric motor to give an electrical signal indicating the current requirements of the centrifugal pump, an inlet line opening into the settling tank, an outlet line from the lower portion of the settling tank, a control valve in the settling tank outlet line, and conducting means from the control means to the control valve whereby the control valve is actuated in response to the electrical signal from the electric control means to control flow of fluids possessing a specific gravity higher than oil through the settling tank outlet line to maintain the interface between the oil and fluids of higher specific gravity at the desired height within the settling tank.

2. A method for controlling the location of the interface between two immiscible fluids of different densities in a vessel comprising continuously introducing into the vessel a mixture of the two fluids, discharging the fluid of lowest density through an upper outlet line opening into the upper portion of the vessel, discharging the fluid of highest density through a lower outlet line opening into the lower portion of the vessel, continuously withdrawing fluid from an intermediate level in the vessel between the outlets, passing the continuously withdrawn fluid through an electrically driven pump and recirculating the continuously withdrawn fluid into the vessel, deriving a signal from the current requirements for driving the pump, and operating valve means in the lower outlet line in response to the signal to maintain the interface of the immiscible fluids within the vessel at the desired height.

3. Apparatus for controlling the location of the interface between liquids of different densities in a settling tank comprising an upper outlet line opening into the settling tank near the upper end thereof, a lower outlet line opening into the settling tank near the lower end thereof, an inlet line opening into the settling tank, a tubular sample gathering line opening into the settling tank at a position between the upper and lower outlets, a pump having its inlet connected to the outlet end of the tubular sample gathering line, a recirculating line extending from the outlet of the pump to the inlet line, an electric motor connected to the pump adapted to drive the pump, electrical control means connected to the motor to give an electrical signal indicating the current required by the motor to drive the pump, a control valve in the lower outlet, and conductor means from the electrical control means to the control valve whereby the control valve is actuated in response to the electrical signal from the electrical control means to control flow through the outlet line and thereby maintain the interface within the settling tank at the desired height.

References Cited
UNITED STATES PATENTS

| 1,481,901 | 1/1924 | Hapgood | 210—97 X |
| 2,125,722 | 8/1938 | Hawkins | 210—97 X |

REUBEN FRIEDMAN, *Primary Examiner.*

J. ADEE, *Assistant Examiner.*